United States Patent
Scheinert et al.

(10) Patent No.: US 9,451,471 B2
(45) Date of Patent: Sep. 20, 2016

(54) TRAFFIC DISTANCE METHOD FOR WIRELESS COMMUNICATIONS SYSTEMS

(71) Applicant: Tektronix, Inc., Beaverton, OR (US)

(72) Inventors: Stefan Scheinert, Vista, CA (US); Vladan Jovanovic, Beaverton, OR (US)

(73) Assignee: Tektronix Texas, LLC, Westford, MA (US)

( * ) Notice: Subject to any disclaimer, the term of this patent is extended or adjusted under 35 U.S.C. 154(b) by 63 days.

(21) Appl. No.: 14/323,185

(22) Filed: Jul. 3, 2014

(65) Prior Publication Data

US 2015/0011178 A1 Jan. 8, 2015

Related U.S. Application Data

(60) Provisional application No. 61/835,082, filed on Jun. 14, 2013.

(51) Int. Cl.
*H04M 11/00* (2006.01)
*H04W 16/18* (2009.01)
*H04W 24/02* (2009.01)

(52) U.S. Cl.
CPC ............. *H04W 16/18* (2013.01); *H04W 24/02* (2013.01)

(58) Field of Classification Search
CPC ... H04W 16/00; H04W 16/04; H04W 16/20; H04W 16/18; H04W 16/24; H04W 24/00; H04W 24/06; H04W 24/08
USPC ............ 455/422.1, 423, 444, 446, 453, 524, 455/525; 370/328, 331, 332, 338
See application file for complete search history.

(56) References Cited

U.S. PATENT DOCUMENTS

| | | | | |
|---|---|---|---|---|
| 8,121,604 B1* | 2/2012 | Schwinghammer | .. | H04W 36/22 370/331 |
| 8,565,718 B1* | 10/2013 | Erman | ................. | H04W 48/06 455/405 |
| 2003/0186693 A1* | 10/2003 | Shafran | ................. | H04W 24/00 455/423 |
| 2007/0099561 A1* | 5/2007 | Voss | ...................... | H04W 24/00 455/12.1 |
| 2009/0111462 A1* | 4/2009 | Krinsky | ................. | H04W 24/08 455/423 |
| 2014/0038631 A1* | 2/2014 | Kruglick | ........... | H04W 72/0426 455/452.2 |
| 2015/0055479 A1* | 2/2015 | Reider | .................. | H04W 36/22 370/236 |

* cited by examiner

*Primary Examiner* — Kwasi Karikari
(74) *Attorney, Agent, or Firm* — Locke Lord LLP; Scott D. Wofsy; Christopher J. Capelli

(57) ABSTRACT

A method for determining a cell placement efficiency number for a wireless cell by computing a first radius R1, wherein the first radius R1 defines a first region that comprises a first threshold TH1 of the total cell traffic. A second radius R2 is computed, wherein the second radius R2 defines a second region that comprises a second threshold TH2 of the total cell traffic. A cell placement efficiency value is then computed using R1 and R2.

20 Claims, 3 Drawing Sheets

TRAFFIC DISTANCE METHOD FOR WIRELESS COMMUNICATIONS SYSTEMS

PRIORITY CLAIM

The present application claims the priority benefit of U.S. provisional patent application No. 61/835,082 filed Jun. 14, 2013, the disclosure of which is incorporated herein by reference.

BACKGROUND

Conventional wireless cellular telephone networks were designed to provide coverage for a given area, so that rather large cells (with radii of approximately one to five miles or more) were originally positioned in such a way that coverage was optimal.

Accordingly, there is a need for a method to determine a cell position in an existing wireless network and, more particularly, for determining how to optimally position a new or existing cell within an existing overloaded cell that is running out of capacity in a wireless network so as to optimize the offloading capacity.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method for determining a cell placement efficiency number for a wireless cell is described. The method includes computing a first area R1, wherein the first area R1 defines a first region that comprises a first threshold TH1 of the total cell traffic; computing a second area R2, wherein the second area R2 defines a second region that comprises a second threshold TH2 of the total cell traffic; and computing a cell placement efficiency number using R1 and R2.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1:
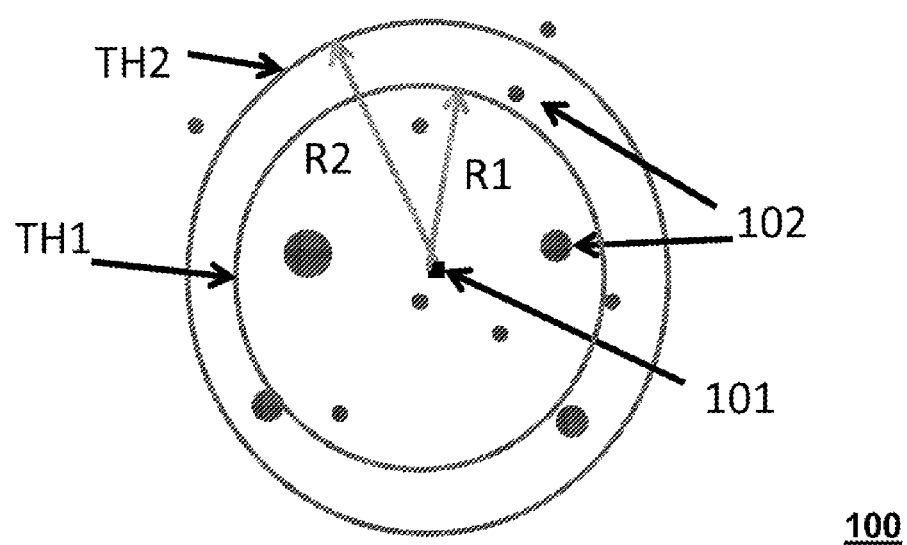
FIG. 1 is a drawing showing an example of a traffic map of a wireless cell.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings. The embodiments illustrated herein are related to commonly assigned U.S. Pat. Nos. 8,606,275; 8,620,630; 8,738,337; and serial application Ser. No. 13/951,703, each of which are hereby incorporated by reference in their entity.

More recently, network usage has been expanding and capacity issues are cropping up very frequently, especially due to the enormous increases of the data traffic.

In all modern data systems, transmitters tend to adjust the modulation and coding schemes in order to maximize the data rate that can be supported given the radio frequency (RF) conditions as reported by the receivers over a feedback channel. One of the consequences is that the same number of data bytes transmitted between a base station and a mobile station may require different amount of radio resources. For example, if a mobile station is close to the cell site, the radio connection may be strong and may require few radio resources. If, however, the mobile station is close to the cell edge, the radio connection may be weaker and this mobile station may require more radio resources to transmit the same amount of data. A weak radio connection is due either to low signal strength or strong interference from other cells. A strong radio connection would have sufficient signal strength and minimal interference.

If a cell has to handle multiple mobile stations with weak radio connections, it will typically run out of capacity much sooner than a cell with strong radio connections, and will require additional means to offload the cell data traffic.

From a capacity planning standpoint, a cell needs to offload a portion of its capacity when its own capacity is exhausted. Ideally, even while needing to offload capacity, the cell may show adequate RF performance. If a cell runs out of capacity when there is low RF performance, it may be preferable to optimize the RF conditions in the cell coverage area so that fewer resources are needed for the same traffic. However, if the low RF performance is based on a non-optimal cell location, so that, for example, most traffic is handled at the edge of the cell, then the solution may involve one or more of moving the cell and adding a new cell in a better location relative to the traffic load. Cells may be one or more of standard macro cells, small indoor cells, and small outdoor cells.

According to embodiments of the invention, a method may rank cells based on where the traffic density center is and therefore help network optimizers identify if the poor cell performance is based on the traffic distribution within a cell.

Embodiments of the invention may utilize geo-located call data records, from which the amount of data and the location within the cell can be determined. Based on the server maps, embodiments of the invention may determine a first traffic distance, which may be defined as the distance between the cell site and a first threshold R1 of the cell traffic, as well as a second traffic distance, which may be defined as the distance between the cell site and a second threshold R2 of the cell traffic. For example, the first threshold R1 may be 50% of the total cell traffic. For example, the second threshold R2 may be 90% of the total cell traffic. The ratio R1/R2 may be used to rank different cells. The ratio does not depend on the absolute distances.

For example, TrueCall, a product of Newfield Wireless of Berkeley, Calif. (www.newfieldwireless.com), may be used to determine one or more of first threshold R1 and second threshold R2. For example, one or more of first threshold R1 and second threshold R2 may be defined by a user.

A method for determining a cell placement efficiency number for a wireless cell comprises: computing a first radius R1, wherein the first radius R1 defines a first region that comprises a first fraction P1 of the total cell traffic; computing a second radius R2, wherein the second radius R2 defines a second region that comprises a second fraction P2 of the total cell traffic; and computing a cell placement efficiency number using R1 and R2.

According to embodiments of the invention, a method is provided to calculate a number that represents the distance of the average traffic compared to the cell edge and reflects the efficiency of cell placement relative to the existing traffic load. This will enable an operator to generate a number that represents a cell's relative need to offload capacity. According to embodiments of the invention, the method may enable an operator to rank cells regarding their relative need to offload capacity.

In a mobile network a cell handles traffic within its best server area, which is an area where the cell is dominant and therefore the best candidate of cells serving this area. In the following it is assumed that an analyzing tool has access to call data records (CDR) that contain at least cell identification, traffic volume, and traffic location within the network. As an option other data than CDRs could be used, like performance measurement (PM) data or network probes.

It is to be appreciated cell data traffic may be accumulated over time. For example, traffic of one week can be used to generate traffic maps.

FIG. 1 is a drawing showing an example of a traffic map of a cell. As depicted in FIG. 1, a cell 100 with a center 101 handles traffic at different locations 102 within cell 100. The relative size of the locations 102 indicates the relative traffic volume for a location 102. Size of a location 102 may comprise one or more of the number of bytes offered, the number of bytes transmitted, the number of calls, the number of call minutes, and a measure of actual resource utilization. For example, in the case of Long-Term Evolution (LTE), a measure of actual resource allocation is the used number of Physical Resource Blocks (PRB). For example, in the case of Evolution-Data Optimized (1xEV-DO), a measure of actual resource allocation is the number of utilized time slots on a downlink.

First area TH1 represents the area of a first threshold TH1 of total traffic within the cell 100. For example, first threshold TH1 may be approximately equal to 50% of the total cell traffic. First area TH1 has a first radius R1.

Second area TH2 represents the area of a second threshold TH2 of total traffic within the cell 100. For example, second threshold TH2 may be approximately equal to 90% of the total cell traffic. Second area TH2 has a second radius R2.

A cell placement efficiency number may then be computed using R1 and R2. The cell placement efficiency number may measure the peakedness of the traffic distribution as a function of the distance from the cell near the origin. The cell placement efficiency number may measure how close most of the traffic is relative to its base station. The lower the cell placement efficiency number, the closer most of the traffic may be to the base station location, which indicates a well-positioned base station site. In case the cell placement efficiency number is higher, it may be more likely it is that most of the traffic is more at the cell edge and therefore the handling of most of the traffic cannot be done as efficiently.

Other embodiments of the invention may apply measures of kurtosis described in the statistical literature, for example, methods based on robust estimators using the percentiles such as Moors coefficient, and more complex approaches such as those of Hogg.

For example, a cell placement efficiency number may be computed by computing a ratio of R1/R2. The ratio R1/R2 may measure the peakedness of the traffic distribution as a function of the distance from the cell near the origin. The ratio R1/R2 may measure how close most of the traffic is relative to its base station. The lower the ratio R1/R2, the closer most of the traffic may be to the base station location, which indicates a well-positioned base station site. In case the ratio R1/R2 is higher, it may be more likely it is that most of the traffic is more at the cell edge and therefore the handling of most of the traffic cannot be done as efficiently. The ratio R1/R2 was found to work reasonably well in practice.

For example, a cell placement efficiency number may be computed by determining the absolute distance between first radius R1, which corresponds to the first threshold TH1, and second radius R2, which corresponds to the second threshold TH2. This approach can be used according to embodiments of the invention to determine a traffic-offset measured in meters or feet.

According to embodiments of the invention, difference cells may be ranked according to their relative need to offload capacity. According to embodiments of the invention, estimates may be obtained of the distance of the traffic within the cell. According to embodiments of the invention, the cell placement efficiency number may be tracked over time in order to determine if cell traffic is moving. The reasons for such movements are almost limitless but some representative reasons might include one or more of erection of one or more of a new building, shopping center, and the like, and a change in prominence of one or more of an existing building, shopping center, and the like.

It is to be appreciated other embodiments of the invention may operate in three dimensions and thereby may track location as well as position.

Embodiments of the invention may be applied to a range of standards, including but not limited to Global System for Mobile Communications (GSM), Code Division Multiple Access (CDMA), Universal Mobile Telecommunications System (UMTS)/High Speed Packet Access (HSPA) and LTE. Embodiments of the invention may be used for a downlink, for example, from a base station to a User Equipment (UE). Embodiments of the invention may be used for an uplink, for example, from a UE to a base station.

Figure 2:
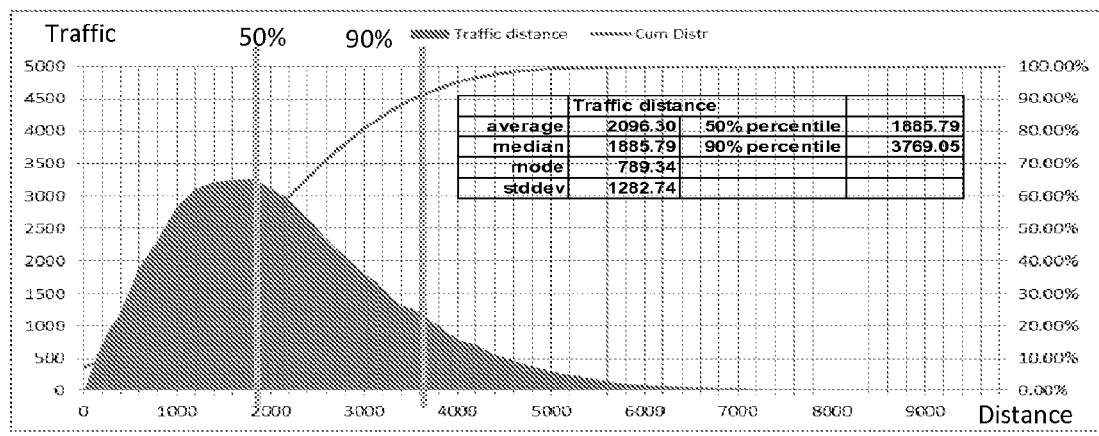
FIG. 2 is an exemplary traffic distance histogram for the wireless cell of FIG. 1.

FIG. 2 is an exemplary traffic distance histogram for a cell. FIG. 2 includes lines respectively indicating the 50th and 90th percentiles of cell traffic. The line corresponding to the $50^{th}$ percentile represents the amount of cell traffic comprised in first cell threshold TH1, and in first radius R1. The line corresponding to the $90^{th}$ percentile represents the cell traffic comprised in second cell threshold TH2, and within second radius R2. In this example, R1/R2 is 50%, when R1 represents 50% percentile and R2 90%. As can be seen, rather than using percentile values mode, average or standard deviation values could be used instead to calculate traffic distances or traffic specific numbers of a cell.

While the first area TH1 and the second area TH2 have been presented in these simplified examples with a respective first radius R1 and second radius R2, embodiments of the invention are fully applicable to cases in which one or more of the first and second areas TH1 and TH2 are not circular. Embodiments of the invention are fully applicable to first and second areas TH1 and TH2 with arbitrary shapes.

With the method of the illustrated embodiments described above, reference is now made to FIG. 3 which illustrates a block diagram of an example computer system 500 on which an example method for determining a value representative of the distance of the average cell data traffic compared to a wireless cell edge for determining the efficiency of cell placement relative to the existing cell traffic load may operate in accordance with the described embodiments. The computer system 500 of FIG. 3 includes a computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and nonvolatile media, and both removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer readable media.

Figure 3:
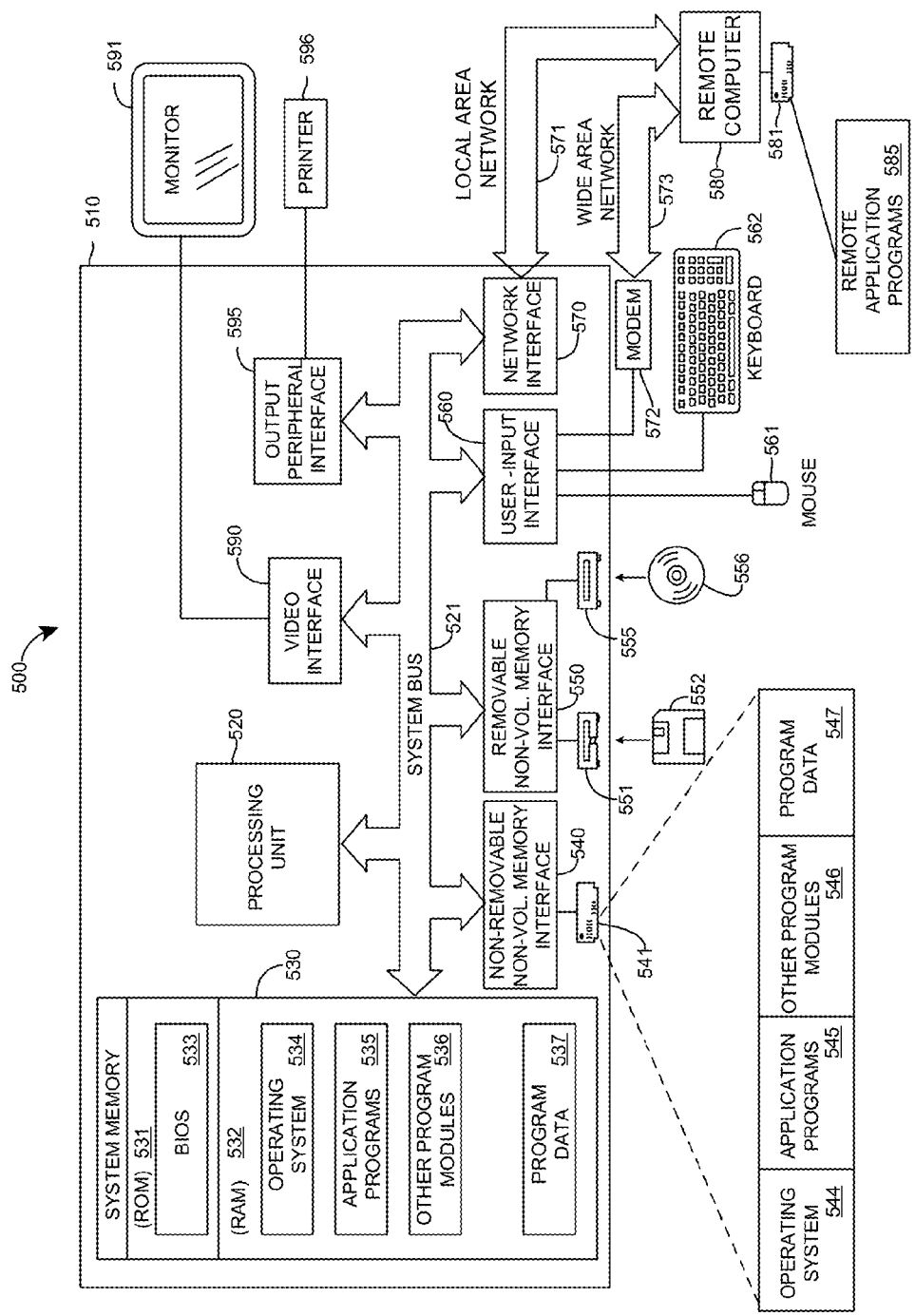
FIG. 3 illustrates a block diagram of an example computer system on which an example method for determining a value representative of the distance of the average cell data traffic compared to a wireless cell edge for determining the efficiency of cell placement relative to the existing cell traffic load may operate in accordance with the illustrated embodiments.

The system memory 530 includes computer storage media in the form of volatile and/or nonvolatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 3 illustrates operating system 534, application programs 535, other program modules 536, and program data 537.

The computer 510 may also include other removable/non-removable, volatile/nonvolatile computer storage media. By way of example only, FIG. 3 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 3 provide storage of computer readable instructions, data structures, program modules and other data for the computer 510. In FIG. 3, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and cursor control device 561, commonly referred to as a mouse, trackball or touch pad. A monitor 591 or other type of display device is also connected to the system bus 521 via an interface, such as a graphics controller 590. In addition to the monitor, computers may also include other peripheral output devices such as printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 3. The logical connections depicted in FIG. 3 include a local area network (LAN) 571 and a wide area network (WAN) 573, but may also include other networks.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the input interface 560, or other appropriate mechanism. In a networked environment, program modules depicted relative to the computer 510, or portions thereof, may be stored in the remote memory storage device 581. By way of example, and not limitation, FIG. 3 illustrates remote application programs 585 as residing on memory device 581.

The communications connections 570, 572 allow the device to communicate with other devices. The communications connections 570, 572 are an example of communication media, as discussed above.

The methods of the wireless cell embodiments described above may be implemented in part or in their entirety using one or more computer systems such as the computer system 500 illustrated in FIG. 3.

Some or all calculations performed in the wireless cell system embodiments described above (e.g., determining a value representative of the distance of the average cell data traffic compared to a wireless cell edge for determining the efficiency of cell placement relative to the existing cell traffic load.) may be performed by a computer such as the computer 510, and more specifically may be performed by a processor such as the processing unit 520, for example. In some embodiments, some calculations may be performed by a first computer such as the computer 510 while other calculations may be performed by one or more other computers such as the remote computer 580. The calculations may be performed according to instructions that are part of a program such as the application programs 535, the application programs 545 and/or the remote application programs 585, for example.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain fabrication steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for determining a cell placement efficiency number for a wireless cell, comprising:
   computing by a processor a first dimension (R1), wherein the first dimension defines a first region that consists of a first threshold (TH1) of total cell traffic data for the wireless cell;
   computing by the processor a second dimension (R2), wherein the second dimension R2 defines a second region that consists of a second threshold (TH2) of the total cell traffic data for the wireless cell; and
   computing by the processor a cell placement efficiency value using R1 and R2,
   wherein computing the cell placement efficiency value includes determining by the processor a value representative of the distance of average cell data traffic compared to a cell edge of the wireless cell so as to indicate efficiency of cell placement relative to cell data traffic load.

2. The method as recited in claim 1, wherein the first dimension R1 is defined by a first radius.

3. The method as recited in claim 2, wherein the second dimension R2 is defined by a second radius.

4. The method as recited in claim 1, wherein TH1 is 50% of the total cell traffic for the wireless cell.

5. The method as recited in claim 4, wherein TH2 is 90% of the total cell traffic for the wireless cell.

6. The method as recited in claim 1, wherein the cell placement efficiency value is determined by the equation R1/R2.

7. The method as recited in claim 1, wherein more than one first dimensions (R1) are computed.

8. The method as recited in claim 7, wherein more than one second dimensions (R2) are computed.

9. The method as recited in claim 1, wherein computing the cell placement efficiency value includes accessing call data records containing at least cell identification information, cell traffic volume and cell traffic location within a wireless network.

10. The method as recited in claim 1, wherein the total cell traffic data is accumulated over a period of time to generate cell data traffic maps.

11. A method for determining a cell placement efficiency number for a wireless cell, comprising:
    computing by a processor a first dimension (R1), wherein the first dimension defines a first region that consists of a first threshold (TH1) of total cell traffic data for the wireless cell;
    computing by the processor a second dimension (R2), wherein the second dimension R2 defines a second region that consists of a second threshold (TH2) of the total cell traffic data for the wireless cell; and
    computing by the processor a cell placement efficiency value using R1 and R2,
    wherein the cell placement efficiency value indicates at least one of peakedness of cell data traffic distribution and proximity of the cell traffic data to a cell base station.

12. The method as recited in claim 11, wherein the first dimension R1 is defined by a first radius and the second dimension R2 is defined by a second radius.

13. The method as recited in claim 12, wherein the cell placement efficiency value is determined by the equation R1/R2.

14. The method as recited in claim 13, wherein computing the cell placement efficiency value includes accessing call data records containing at least cell identification information, cell traffic volume and cell traffic location within a wireless network.

15. The method as recited in claim 14, wherein the total cell traffic data is accumulated over a period of time to generate cell data traffic maps.

16. A method for determining a cell placement efficiency number for a wireless cell, comprising:
    computing by a processor a first dimension (R1), wherein the first dimension defines a first region that consists of a first threshold (TH1) of total cell traffic data for the wireless cell;
    computing by the processor a second dimension (R2), wherein the second dimension R2 defines a second region that consists of a second threshold (TH2) of the total cell traffic data for the wireless cell; and
    computing by the processor a cell placement efficiency value using R1 and R2,
    wherein R1 and R2 are computed utilizing geo-located call data records such that an amount of cell data and the location within the wireless cell is determined.

17. The method as recited in claim 16, wherein the first dimension R1 is defined by a first radius and the second dimension R2 is defined by a second radius.

18. The method as recited in claim 16, wherein the cell placement efficiency value is determined by the equation R1/R2.

19. The method as recited in claim 16, wherein computing the cell placement efficiency value includes accessing call data records containing at least cell identification information, cell traffic volume and cell traffic location within a wireless network.

20. The method as recited in claim 16, wherein the total cell traffic data is accumulated over a period of time to generate cell data traffic maps.

\* \* \* \* \*